(12) United States Patent
Tagge

(10) Patent No.: US 9,256,296 B2
(45) Date of Patent: Feb. 9, 2016

(54) INTEGRATED, ONE-HANDED, MOUSE AND KEYBOARD

(71) Applicant: Mark Andrew Tagge, Flint, MI (US)

(72) Inventor: Mark Andrew Tagge, Flint, MI (US)

( * ) Notice: Subject to any disclaimer, the term of this patent is extended or adjusted under 35 U.S.C. 154(b) by 213 days.

(21) Appl. No.: 13/925,803

(22) Filed: Jun. 24, 2013

(65) Prior Publication Data

US 2014/0375566 A1   Dec. 25, 2014

(51) Int. Cl.
*G06F 3/023* (2006.01)
*G06F 3/02* (2006.01)
*G06F 3/0354* (2013.01)
*G06F 3/0338* (2013.01)

(52) U.S. Cl.
CPC ............ *G06F 3/0233* (2013.01); *G06F 3/0216* (2013.01); *G06F 3/0338* (2013.01); *G06F 3/03543* (2013.01)

(58) Field of Classification Search
CPC ... G06F 3/0235; G06F 3/0213; G06F 3/0233; G06F 3/0338; G06F 3/03543; G06F 3/0216
USPC ........................................................ 345/168
See application file for complete search history.

(56) References Cited

U.S. PATENT DOCUMENTS

| | | | | |
|---|---|---|---|---|
| 4,849,732 A * | 7/1989 | Dolenc | ...................... | B41J 5/10 200/5 R |
| 5,583,497 A * | 12/1996 | Hankes | ................. | G06F 3/0219 341/22 |
| 5,682,151 A * | 10/1997 | Oliveros | ......................... | 341/23 |
| 5,764,164 A * | 6/1998 | Cartabiano | ............. | A63F 13/06 273/148 B |
| 6,765,502 B2 * | 7/2004 | Boldy et al. | ..................... | 341/22 |
| 2003/0030625 A1 * | 2/2003 | Kauk et al. | ..................... | 345/169 |
| 2004/0041787 A1 * | 3/2004 | Graves | ......................... | 345/157 |
| 2004/0263479 A1 * | 12/2004 | Shkolnikov | ................... | 345/169 |
| 2005/0083297 A1 * | 4/2005 | Duncan | ................... | A63F 13/06 345/156 |
| 2006/0202865 A1 * | 9/2006 | Nguyen | ........................ | 341/22 |
| 2008/0074389 A1 * | 3/2008 | Beale | ........................... | 345/161 |

* cited by examiner

Primary Examiner — Claire X Pappas
Assistant Examiner — Robert Stone
(74) Attorney, Agent, or Firm — Thomas P. Heed

(57) ABSTRACT

An integrated mouse and keyboard intended to be used to type with only one hand. The mouse is contoured so that the wrist is in a neutral position during typing. The characters associated with any individual key can be changed through the use of one of two joysticks. The user may define the relationship between the joysticks, keyboard keys, and character sets.

7 Claims, 4 Drawing Sheets

INTEGRATED, ONE-HANDED, MOUSE AND KEYBOARD

FIELD OF INVENTION

This invention relates to the field of electricity: electrical systems and devices. Specifically, the present invention relates to adjustable keyboards and/or split keyboards (U.S. Classifications 361/679.11 and 361/679.14).

BACKGROUND OF INVENTION

Prolonged use of a computer keyboard can, at best, leave the user sore, and at worst, give the user carpal tunnel syndrome. The reason for this is that the hands and the body must be held in artificial positions in order to use the most commonly available keyboards. Carpal tunnel syndrome/repetitive motion injury (CTS/RMI) is the result of long-term, repeated motions. Among the factors that aggrevate CTS/RMI are repetition of motion, frequency of movement, impact, improper hand or wrist position, and poor posture.

Almost all of the commercially available keyboards use either the QWERTY layout or the Dvorak layout. The QWERTY keyboard remains the standard keyboard, taking its name from the six keys at the beginning of the first row of letters. The QWERTY keyboard was originally designed for mechanical typewriters. The layout chosen was believed to slow the user's key strokes down so that the machine did not become bound. The QWERTY keyboard was in use as early as 1873, and it is the layout used by most users. The QWERTY keyboard is sub-optimal because it is specifically designed to slow the user, by making the user move further to perform a given sequence of key strokes. Additionally, since it increases the motion needed to type, the QWERTY keyboard is associated with higher key impact. The QWERTY keyboard has been associated with CTS/RMI.

The Dvorak keyboard was patented in 1936 by Dr. August Dvorak and his brother-in-law. The Dvorak keyboard was designed to reduce the distance the fingers traveled in order to perform a given sequence of typing. The Dvorak keyboard has under-gone slight modifications since it was originally introduced, but all the different versions share a common goal: reduce the distance that the fingers travel. The Dvorak keyboard was adopted as the alternative keyboard to the QWERTY keyboard by the American National Standards Institute (ANSI). The failure of the Dvorak keyboard to penetrate the keyboard market is studied in many top business and economics schools. Part of the problem with implementing the Dvorak keyboard is a General Services Administration study, conducted in 1956 by Earle Strong. Strong concluded that the cost of implementation would be greater than any realistic benefit. This report has been frequently cited as a reason for not implementing the Dvorak keyboard by businesses and government.

Both the QWERTY keyboard and the Dvorak keyboard are designed to be used with two-hands, although the Dvorak keyboard does have left-handed and right-handed versions. The left-handed and right-handed Dvorak keyboard are meant to help people who have use or movement in only one arm or hand. In addition to the one-handed Dvorak keyboards, there are many other products on the market for people who can only type with one arm or hand. For example, there is the FrogPad™, which requires users to learn to make their hands "jump", in order to type. In other words, the FrogPad™ product does the opposite of the Dvorak product: it increases the distance that the hand and fingers will travel. Although the FrogPad™ is marketed to the general public, a plurality of their reviews on their website are from users with cerebral palsy. There are additional one-handed keyboards which appear to be mostly marketed to those with physical impairment of one limb. These products include traditional QWERTY keyboards reconfigured as left-handed or right-handed keyboards, and the Maltron one-handed keyboard. All of the one-handed solutions are designed to allow the user to type with one-hand. However, all of them fail to allow the user to type from the natural rest position of the hand.

None of the current solutions on the market minimize all of the factors of CTS/RMI. The QWERTY and Dvorak keyboards encourage an unnatural position for both the wrist and the body. The damage done by the unnatural position required by a traditional flat keyboard are mitigated in some of the current prior art by using a split keyboard or attempting to rest the hand in a more neutral position. Largely, in use, typists tend to revert to a flexed wrist when using these devices, although the angle of flex may be smaller than with a traditional keyboard. Additionally, QWERTY keyboards and FrogPads increase the impact of typing by maximizing the distance that the fingers travel, thereby increasing the finger speed. What the market needs is a one-handed keyboard that allows both able-bodied and physically-impaired users to type using one hand. Ideally, the wrist should be at a neutral position, and should flex bi-laterally about the neutral position. Integrating such a solution with a mouse would further reduce the amount of movement of the hand and wrist.

SUMMARY OF THE INVENTION

The present invention is a keyboard integrated with a traditional mouse. The keyboard is programmable, to allow it to be used with specialized character sets or as a data-entry device. The integrated keyboard and mouse keep the users wrist in a neutral position, and any movement of the wrist is bi-lateral around rest position, meaning that the wrist is equally likely to flex in both directions during use.

The present invention has eighteen keys and two joysticks integrated into the surface of a mouse. Since most users are familiar and trained with a traditional QWERTY keyboard, the default layout of the present invention would use the layouts given by the QWERTY keyboard, with some slight changes that should improve the user's typing speed. In its default layout, a user would toggle between the left-side and right-side of a traditional QWERTY keyboard by using one of two joysticks. When the Joystick #1 is in the neutral position, the right-hand side of the modified QWERTY keyboard would be activated. When Joystick #1 is pushed down, the left-hand side of the modified QWERTY keyboard would be activated. The downward motion on Joystick #1 is accomplished by just moving the thumb slightly on the mouse.

Further characters are available by moving the joysticks in different directions. In order to activate the numbers and the most common special characters, Joystick #1 is pushed up. To activate the remaining character sets, Joystick #1 is moved up and depressed.

The present invention can be customized by the user, so that different layouts are available. Additionally, the present invention is easily modified to support Arabic, Cyrillic and other character sets.

BRIEF DESCRIPTION OF THE DRAWINGS

There are seven relevant drawings.

DETAILED DESCRIPTION OF THE PREFERRED EMBODIMENTS

The following description represents one of the inventors' current preferred embodiments. The description is not meant to limit the invention, but rather to illustrate its general principles of operation. Examples are illustrated with the accompanying drawings. A variety of drawings are offered, showing the present invention with various activated character sets.

Figure 1:
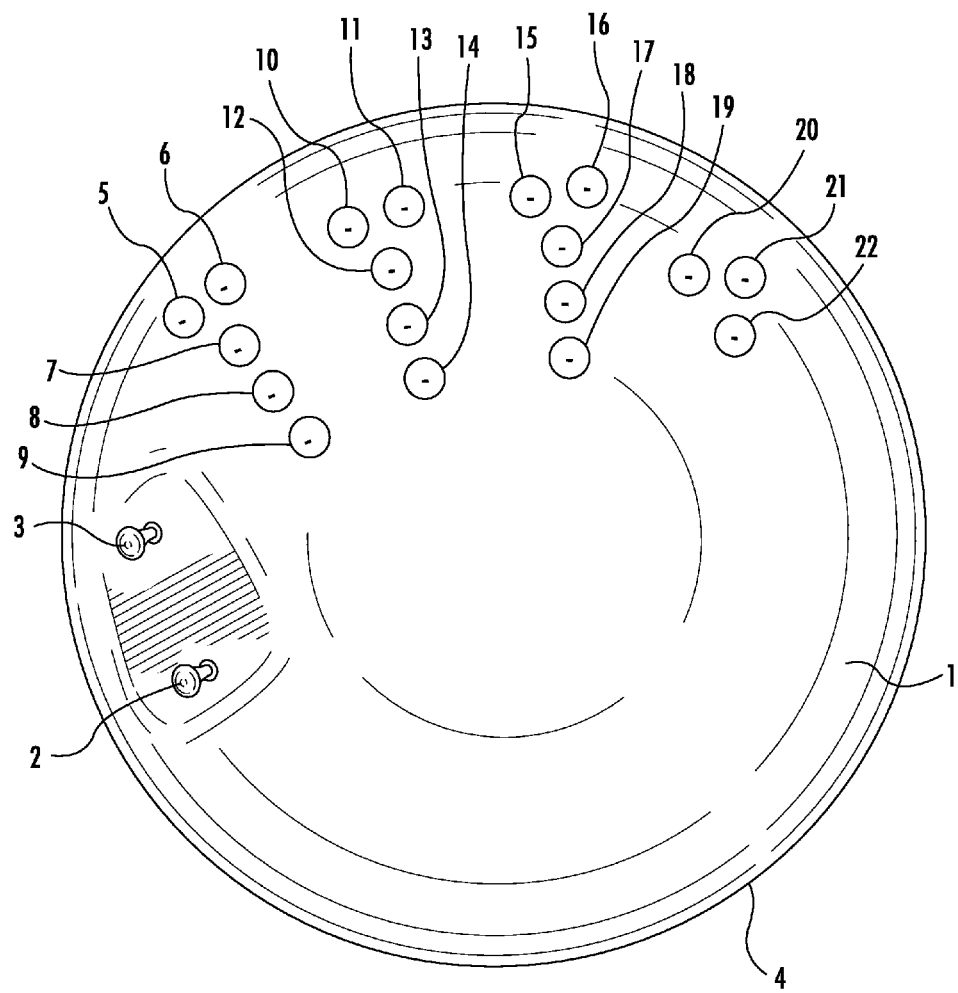
FIG. 1 is a top view of an integrated mouse and keyboard.

FIG. 1 is a top view of the present invention, an integrated keyboard and mouse 1. The integrated keyboard and mouse 1 has a top surface 1. The integrated keyboard and mouse 1 has a defined perimeter 4. The keyboard portion of the invention has eighteen keys 5, 6, 7, 8, 9, 10, 11, 12, 13, 14, 15, 16, 17, 18, 19, 20, 21, 22. The version shown in FIG. 1 is for right-handed typing. The right-hand index finder controls five keys: 5, 6, 7, 8, 9. The right-hand middle finger controls five keys: 10, 11, 12, 13, 14. The right-hand ring finger controls five keys: 15, 16, 17, 18, 19. The right-hand pinkie finger controls three keys: 20, 21, 22.

The present invention, an integrated mouse and keyboard 1, has two joysticks 2, 3, controlled by the thumb. Either joystick 2,3 may be designated Joystick #1. For this embodiment, the upper joystick 3 will be designated as Joystick #1. Traditional mouse functionality is achieved by moving Joystick #1 3. For example, in this embodiment, moving joystick #1 to the right emulates a right mouse click on a traditional PC mouse. Moving joystick #1 to the left emulates a left mouse click on a traditional PC mouse. The mouse functionality can be configured to work with other operating systems.

In the present embodiment, Joystick #2 2 controls other functions, such as activating the ALT keys. By moving Joystick #2 2 to the right, the user activates the ALT keys on the right-hand side of a traditional QWERTY keyboard. By moving Joystick #2 2 to the left, the user activates the ALT keys on the left-hand side of a traditional QWERTY keyboard. The remaining positions for Joystick #2 2 are left undefined. It is intended that the end user program the remaining positions with frequently used words, phrases, or character sets (e.g., Cyrillic character set for scientific notation) to speed up the users typing-rate.

Figure 2:
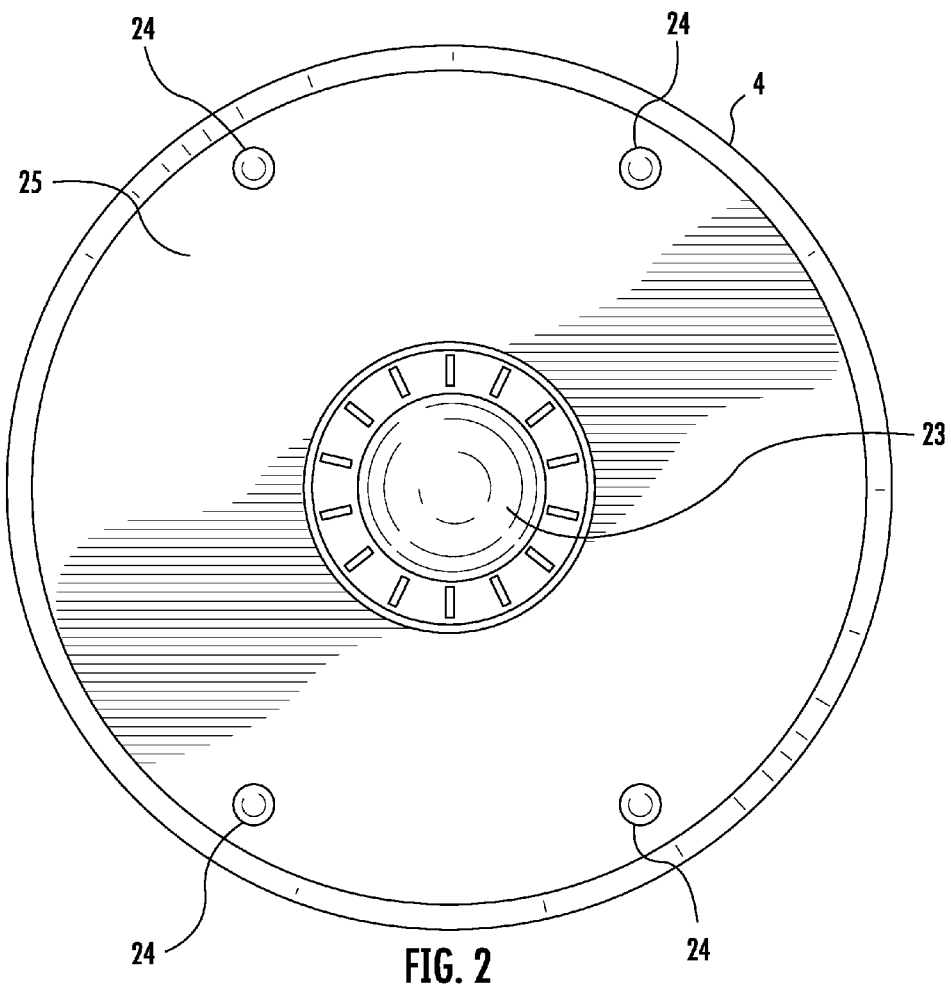
FIG. 2 is a bottom view of an integrated mouse and keyboard.

FIG. 2 is a bottom view of the present invention. The perimeter 4 of the present invention is apparent. FIG. 2 shows a traditional track-ball type mouse, but the present invention can be integrated onto any type of mouse: track-ball, no track-ball, wireless, etc. The track-ball 23 is in the center of the bottom side. There are also four nubs 24 which keeps the mouse from being tilted so that the perimeter 4 hits. The bottom has a face 25.

Figure 3:
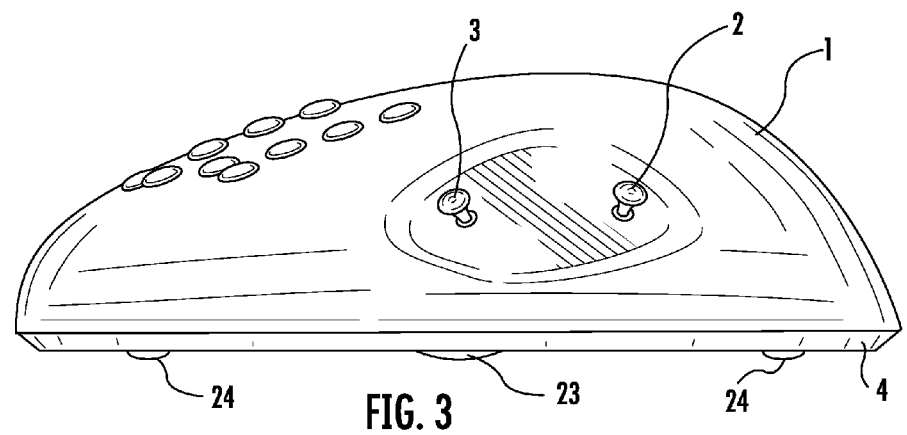
FIG. 3 is a side view of an integrated mouse and keyboard.

FIG. 3 shows a side-view of the present invention, an integrated mouse and keyboard 1. The perimeter 4 of the mouse is visible, as are the track-ball 23 and nubs 24 of the bottom side. The two joysticks 2, 3 are visible. A user would grasp the integrated keyboard and mouse 1, resting the right-hand thumb just above the two joysticks 2, 3.

In rest position, the user's wrist would be in a neutral position. Looking at FIG. 1, the thumb would rest near the joysticks 2,3. The index finger would rest near keys 5, 6. The middle finger would rest near keys 10, 11. The ring finger would rest near keys 15, 16. The pinkie finger would rest near keys 20, 21.

Figure 4:
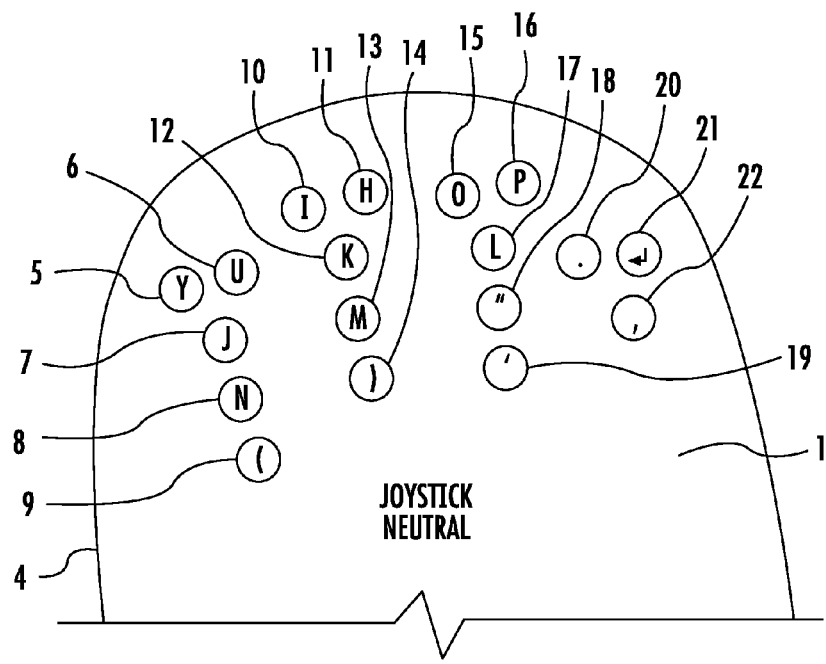
FIG. 4 is a partial top view representing the activated keys with joystick 1 in the neutral position.
Figure 5:
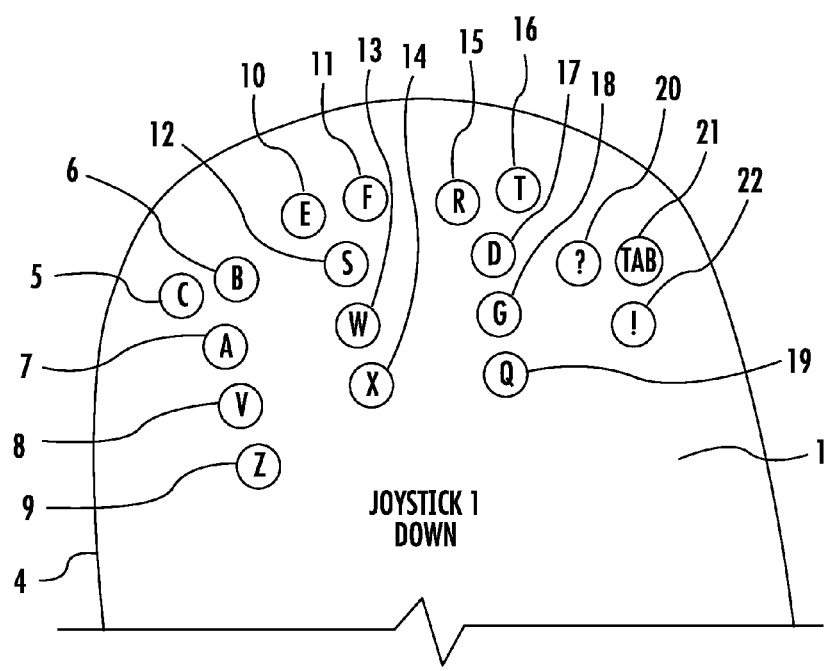
FIG. 5 is a partial top view representing the activated keys with the Joystick #1 pressed in the down position.
Figure 6:
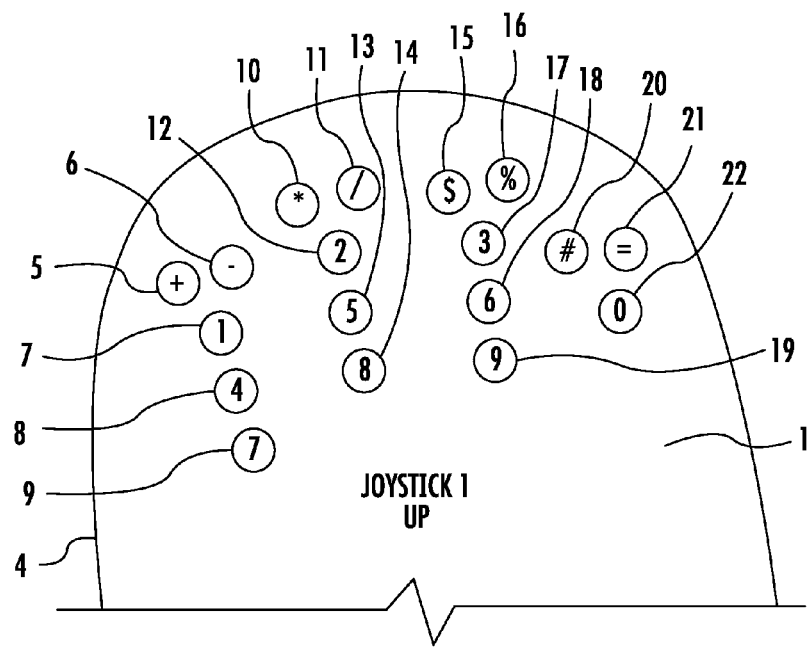
FIG. 6 is a partial top view representing the activated keys with joystick 1 pressed in the up position.
Figure 7:
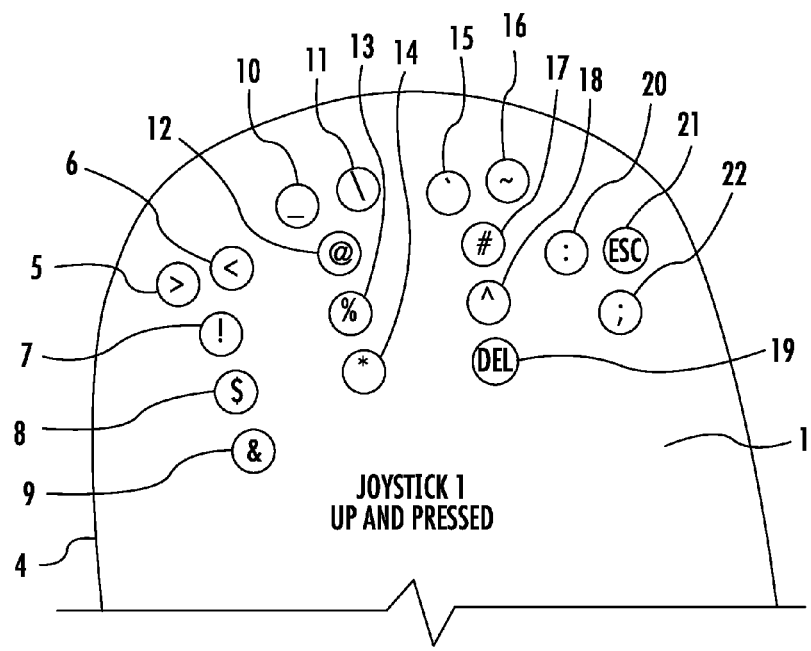
FIG. 7 is a partial top view representing the activated keys with joystick pressed in the up position while being depressed.

FIG. 4 shows the activated keys with Joystick #1 3 in the neutral position, defining a Modified, Right-Handed QWERTY Keyboard. FIG. 5 shows the activated keys with Joystick #1 3 in the down position, defining a Modified, Left-Handed QWERTY Keyboard. FIG. 6 shows the activated keys with Joystick #1 3 in the up position. FIG. 7 shows the activated keys with Joystick #1 3 in the up and depressed position.

I claim:

1. An integrated mouse and keyboard, comprised of a top-side and bottom-side; the top-side being further comprised of two joysticks, eighteen keyboard keys, and a continuous surface between the keyboard keys and joysticks wherein when said two joysticks are in a first reference position, the integrated mouse and keyboard output ascii characters representing a Modified, Right-Handed QWERTY Keyboard, and when said two joysticks are in a second reference position, the integrated mouse and keyboard output ascii characters representing a Modified, Left-Handed QWERTY Keyboard; and wherein said keyboard keys are grouped in three (3) sets of five (5) keys and one (1) set of three (3) keys, each said five (5) key grouping having three (3) keys in a linear arrangement with the remaining two (2) keys each positioned at the end of the linear arrangement, so that the five (5) key grouping resembles the capital letter "T;" and said group of three (3) keys arranged so that each key is the vertex of a triangle.

2. The invention described in claim 1, wherein the top-side is contoured so that the palm of the user's hand rests at the apex of the top side.

3. The invention described in claim 1, wherein the keyboard keys are arranged in-line with the rest position of the fingers, and wherein there are five keys in line with the index finger, five keys in line with the middle finger, five keys in line with the ring finger, and three keys in line with the pinkie finger.

4. The invention described in claim 1, wherein the joysticks are in near proximity with the thumb at rest position, and wherein the top-side is contoured to provide a flat area for the thumb at rest position.

5. The invention described in claim 1, wherein the functionality of a traditional PC mouse is mapped to the joystick designated Joystick #1, so that moving Joystick #1 to the right emulates a right mouse click on a PC computer mouse and moving Joystick #1 to the left emulates a left mouse click on a PC computer mouse.

6. The invention described in claim 1, wherein the user can change the output association between characters sets, traditional mouse functionality, keyboard keys, and the joysticks.

7. The invention described in claim 1, wherein the output is transmitted to a computer or other user device through wireless means.

* * * * *